United States Patent [19]
Katzakian, Jr. et al.

[11] 3,873,602
[45] Mar. 25, 1975

[54] BETA HYDROXY ESTERS

[75] Inventors: Arthur Katzakian, Jr., Sacramento;
Roger B. Steele, Fair Oaks; Joseph J.
Scigliano, Sacramento, all of Calif.

[73] Assignee: Aerojet-General Corporation, El Monte, Calif.

[22] Filed: Jan. 26, 1973

[21] Appl. No.: 327,029

Related U.S. Application Data

[63] Continuation-in-part of Ser. No. 73,589, Sept. 18, 1970, abandoned.

[52] U.S. Cl. ........ 260/475 P, 260/407, 260/475 FR, 260/476 R, 260/484 R, 260/485 G, 260/486 B, 260/487, 260/496
[51] Int. Cl... C07c 69/16, C07c 69/54, C07c 69/82
[58] Field of Search ........ 260/475 P, 485 G, 476 R, 260/484 R, 486 B, 496, 475 FR, 407, 487, 484

[56] References Cited
UNITED STATES PATENTS
3,635,869   1/1972   Steele et al. ...................... 260/30.4

*Primary Examiner*—Lorraine A. Weinberger
*Assistant Examiner*—E. Jane Skelly
*Attorney, Agent, or Firm*—Mark C. Jacobs

[57]          ABSTRACT

A method for promoting the reaction of at least one oxirane compound, e.g., ethylene oxide, with at least one organic carboxylic acid such as terephthalic acid which method is carried out in a mixed solvent system comprising a normally-liquid neutral solvent and a normally-liquid, electron-donating (active) solvent, in the presence of an effective catalytic amount of a chromium III tricarboxylate salt having available coordination sites. The neutral solvent has substantially no coordination affinity for the chromium III catalyst while the electron-donating solvent has a marked ability to coordinate with the chromium III cation. This dual phenomena enhances formation of the desired beta hydroxy ester while retarding formation of the undesired ethers or polyethers.

22 Claims, No Drawings

BETA HYDROXY ESTERS

This application is a continuation-in-part of Ser. No. 73,589, filed Sept. 18, 1970, now abandoned.

BACKGROUND OF THE INVENTION

It is known to react oxirane-containing compounds (epoxy compounds) with organic carboxylic acid compositions, typically at temperatures at or somewhat above ambient, in the presence of active chromium III tricarboxylate salt catalysts which salts have available coordination sites. The method of preparing the active chromium III tricarboxylate salt catalyst is described in the copending application Ser. No. 4,056, filed Jan. 19, 1970, now abandoned, Roger B. Steele and Arthur Katzakian, Jr., and in Ser. No. 218,015, filed Jan. 14, 1972, now abandoned, by the same inventors, the disclosure of which is expressly incorporated herein by reference, and assigned to the same assignee as the instant patent application.

The oxirane-carboxylic acid reaction while proceeding rapidly as described in Ser. No. 4,056, is complicated in some instances, where the acid being reacted is a polycarboxylic aromatic acid, e.g., terephthalic acid. The complicating factors are (a) the low solubility of terephthalic acid in most common solvents, (b) the formation of insoluble chromium terephthalates during the course of the reaction, and (c) the generation of undesirable glycolester ethers via the further reaction of the desired end product with the epoxy compound (ethylene oxide). The low concentration of the terephthalic acid in solution and the lost catalytic activity due to chromium precipitation, both serve to lower the rate of the end product formation and allow the build up of the objectionable glycolester ethers.

The activated chromium III compound not only catalyzes the desired carboxylic acid-oxirane reaction, but also to some degree enhances the formation of the glycolester ethers as well. This fact plus the factors described above tends to produce significant amounts of the undesired glycol ester ethers (10-15% by weight).

With the solvent system of this invention, it has been proven possible to substantially deactivate the catalytic effect of the chromium III compound towards the ether forming reaction without seriously impairing the progress of the desired acid-epoxy reaction. The solvent systems of the invention permits the desired acid-epoxy reaction to proceed at a reasonable rate while substantially preventing the formation of the undesirable glycolester ethers and the loss of active chromium III compound due to precipitation.

SUMMARY OF THE INVENTION

Briefly, in the method of the invention the reaction of at least one epoxy compound with at least one organic carboxylic acid is carried out in a solvent system of a neutral solvent, for example a hydrocarbon, and a coordinating solvent in the presence of an effective catalytic amount of a chromium III tricarboxylate salt which has available coordination sites.

By the term neutral solvent and the term coordinating solvent we intend the following:

Neutral solvents are those solvents which are incapable of effectively donating an unshared pair of electrons to metallic cations. Such neutral solvents comprise any of the alkanes and cycloalkanes which contain from 5 to 10 carbon atoms, the monohydroxy tertiary and secondary alcohols, the halogenated hydrocarbons which contain from 1 to 10 carbon atoms; and at least one halogen atom selected from the group consisting of Br, Cl, I, and F, organic monoketones, and nitriles, linear or branched mono and poly ethers, organic mono- and poly-esters, aromatic and halogenated aromatic hydrocarbons, all of which must have a boiling point under 300°C and which are liquid above about 15°C. Typical examples of neutral solvents of the above categories include; pentane, hexane, heptane, isooctane, cyclopentane, cyclohexane, methylcyclohexane, isopropanol, t-butanol, carbon tetrachloride, bromodichloroethane, chloroethane, dichloroethylene, difluoroethane, n-propyl iodide, acetone, methyl isobutyl ketone, acetonitrile, diisopropyl ether, ethylene glycol dimethyl ether, diethylene glycol dimethyl ether, ethyl acetate, ethylene glycol diacetate, benzene, toluene, o, m and p-xylene, chlorobenzene, dibromobenzene and 4-chlorotoluene.

Active coordinating solvents comprise organic compounds of the classes:

I. Cyclic Ethers and Cyclic thioethers of the formula:

wherein Z represents the atoms necessary to complete a single or fused ring structure which contains from 3 to 11 carbon atoms, wherein said Z atoms are carbon atoms or carbon atoms interposed with a heteroatom, said heteroatom being selected from the group consisting of another O or S, the principal chalcogen atom in the ring being sigma bonded to adjacent carbon atoms, and divalent, said adjacent carbon atoms of the ring having the valences out of the ring satisfied solely by hydrogen, the valences of the remaining atoms within the ring being satisfied with hydrogen or any group non-reactive with oxiranes;

II. Noncyclic primary alcohols of the formula:

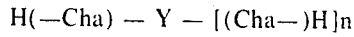

wherein Y represents a linear or branched substituted or unsubstituted hydrocarbon chain, or hydrocarbon chain interrupted by no more than one heteroatom between any 2 carbon atoms, said heratom being selected from the group consisting of S and O, and Y contains up to 9 atoms in the chain, (Cha) is the principal chalcogen, O, and $n$ is an integer of from 0 to 1, III. Heteroatom oxides of the formula:

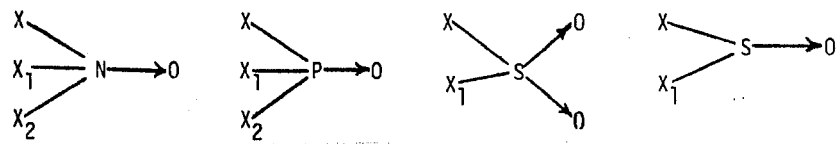

wherein X, $X_1$ and $X_2$ represent any of hydrocarbon chains, hydrocarbon chains interrupted by O,S,N or P heteroatoms, or heteroatoms bonded to hydrocarbon groups, provide that any two of X,$X_1$ and $X_2$ may be joined together to form a cycloaliphatic ring, and all three of X, $X_1$ and $X_2$ may be joined together to form an aromatic ring, and when X, $X_1$ and $X_2$ are linear or branched hydrocarbon chains, said chains contain no more than 6 carbon atoms, and when cyclic structures are present, no more than 8 carbon atoms or carbon atoms plus heteroatoms constitute the cyclic structure, and O is the principal chalcogen atom, IV. Tertiary amides of the formula:

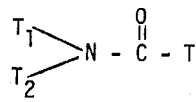

wherein T is selected from the group consisting of H, a aliphatic hydrocarbon group,

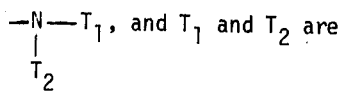, and $T_1$ and $T_2$ are and $T_1$ and $T_2$ are the same or different hydrocarbon groups of from 1 to 6 carbon atoms and $T_1$ and $T_2$ may be joined together to form a heterocyclic ring containing carbon and the nitrogen V. Tertiary phosphorous compounds of the formula:

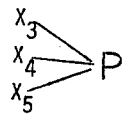

wherein $X_3$, $X_4$ and $X_5$ are the same as X, $X_1$, and $X_2$ previously defined, provided that any two of $X_3$, $X_4$ and $X_5$, may be joined together to form a cycloaliphatic ring.

Said compounds of Groups I through V above having a pH of no less than 7 in water, and a dissociation constant of less than $1 \times 10^{-12}$, and a boiling point of less than 300°C.

Typical exemplary compounds of Group I of the active solvents include: dioxane, dioxolane, furan, 2-t-butyl thiophene, tetrahydrofuran, 3-t-butylthiophene, 2-methylbenzothiazole, benzopyran, tetrahydropyran, and 1, 4-oxathiine.

Typical Group II alcohols include, methanol, butanol, diethylene glycol, the pentane diols, the propylene glycols, ethanol, n-propanol, 1,6-hexane diol, ethylene glycol.

Mention may be made of the following Group III heteroatom oxides, pyridine-N, oxide, tributyl phosphine oxide, dimethyl sulfoxide and sulfolane, hexamethyl phosphoramide, tri-n-butyl amine oxide.

In the category of Group IV tertiary amides, mention may be made of dimethyl formamide, dimethyl acetamide, tetramethyl urea, N-methyl pyrollidone, N-methyl caprolactam.

Among the Group V tertiary phosphorous compounds are tributyl phosphine, trimethyl phosphite, hexamethyl amino phosphine, P-methyl phosphorine.

Although it is seen from the above that several of the heteroatoms may appear in the compounds of the various Groups, at least one of these heteroatom per compound is designated as the principal heteroatom. This heteroatom is responsible for donating an unshared pair of electrons to the positive chromium III nucleus. Thus the term principal chalcogen has been utilized where more than one oxygen or sulfur appear in a coordinating solvent.

The fully-coordinated chromium III tricarboxylate compound has little or no catalytic activity. A wide variety of solvents through coordination with the chromium III compound provide deactivation to varying degrees. Generally, the solvents which are capable of coordinating with the catalyst are derived from the class called coordinating solvents as defined above. These solvents, because of their ability to coordinate with the chromium III catalysts, have a pronounced effect on the reaction between the epoxy and organic carboxylic acid. Many of these solvents when used alone completely stop the reaction between the epoxy compound and the carboxylic acid. Others of the class of coordinating solvents provide deactivation of the catalyst to a lesser degree and the reaction between the oxirane compound and the organic acid proceeds at a lessened rate.

When using neutral solvents alone, such as hydrocarbon solvents, as carriers for the oxirane-carboxylic acid reaction where low solubility of the acid is exhibited, the active chromium III catalyst is seen to exhibit significant activity for the formation of the undesired glycolestes ethers, as well as very high activity for the desired oxirane-carboxylic acid reaction. The neutral solvent has substantially no coordination affinity for the active chromium III compound.

It has now been found that solvent mixtures of neutral and coordinating solvents provide suitable media for the chromium III catalyzed reaction of the epoxy compound and organic carboxylic acid. The coordinating solvent typically comprises 20 volume percent to 80 volume percent of the solvent system used in the method of the invention, the neutral solvent comprising substantially all of the remaining portion of the solvent system. The solvent system of the invention substantially reduces or nearly eliminates the undesirable glycolester ether reaction while permitting the desired reaction between the epoxy compounds and organic carboxylic acids to proceed at a satisfactory rate. The use of the hydrocarbon solvent or other neutral solvent in combination with the coordinating solvent lessens the deactivation effect of the latter solvent as to the desired primary reaction and substantially reduces the amount of the undesirable secondary reaction.

The advantages of the solvent system used in the method of the invention are remarkably demonstrated in the preparation of bis(hydroxylethyl) terephthalate (bis-HET) from ethylene oxide and terephthalic acid. This reaction carried on solely in the neutral solvent 4-methyl-2-pentanone (MIBK) results in the glycolester ethers being produced in the amount of 8.9%, while it is seen that mixtures of toluene, a neutral solvent, combined either with N,N-dimethyl formamide (DMF) or methanol both of which are coordinating solvents provide preferable media for the bis-HET reaction. Conversions to bis-HET were on the order of 80–90% in 60 minutes at 120°C for the methanol-toluene (50/50) system and greater than 98% in 15 minutes at 120°C for the DMF-toluene (50/50) system. The glycolester ether levels were reduced to 1.5% and 1%, respectively, and the catalyst remained soluble as evidenced by the lack of green precipitate at the completion of the reaction. Although the electron donating solvents preferably referred to as the coordinating solvents, are effective catalyst deactivators, they also provide a medium, in which the active chromium III salt remains soluble during the reaction. The mild catalyst deactivation which occurs in the solvent system of this invention is counterbalanced by the solvent system's ability to substantially eliminate the complicating factors aforesaid.

Various hydrocarbons may be employed in the neutral solvent role, including any of those previously recited.

The aromatic hydrocarbon solvents are the preferred hydrocarbon neutral solvents to be used in the solvent system of the invention along with the electron-donating solvent. Other preferred neutral solvents which may be employed are methylisobutyl ketone, acetone and isopropanol. Preferred coordinating solvents include DMF and methanol due to their low cost, effectiveness and volatility.

The process of the invention is particularly useful for reacting either mono epoxy compounds (e.g. ethylene oxide) with the di- and polycarboxylic acids such as trimellitic, isophthalic and adipic acid, as well as the reaction of diepoxides such as vinyl cyclo hexene dioxide with monoacids such as benzoic or acetic acid. The process has also been demonstrated to be effective in reacting aromatic acids such as terephthalic acid with the higher molecular weight epoxyalkanes, e.g., 1,2-epoxyhexane, and 1,2-epoxycyclohexane, and styrene oxide.

The advantages of the present invention may be had using any soluble trivalent chromium III tricarboxylate compound containing available coordination sites which are capable of reversible coordination by the electron-donating solvents discussed above. Typical of such compounds are the active forms of the following: trivalent chromium hexanoate, trivalent chromium pentanoate, trivalent chromium butyrate, trivalent chromium octoate, (2-ethyl-hexanoate), trivalent chromium decanoate, trivalent chromium oleate, trivalent chromium 2-octenoate, trivalent chromium toluate, trivalent chromium cresylate, trivalent chromium benzoate, trivalent chromium ethylbenzoate, trivalent chromium p-methoxybenzoate, the trivalent chromium naphthenates and trivalent chromium phenoxide. Generally, although not necessarily, the dehydrated (activated) trivalent chromium catalysts used in our invention contain from 6 to about 60 carbon atoms. Sufficient solubility of any of the recited active chromium catalysis may be achieved in the solvent systems of the instant invention.

In reaction with a mono-, di- or polyfunctional carboxylic acid, any monofunctional oxirane oxygen compound or mixture of compounds including ethylene oxide, 1,2-propylene oxide, 1,2-butylene oxide, 2,3-butylene oxide, 1,2-epoxyhexane, cyclohexane oxide, cyclopentene oxide, cyclopentadiene monoxide and the like, can be utilized, including those compounds bearing noninterfering substituents such as halogen, cyano, nitro and ester groups. The invention is particularly adapted to the reaction of any epoxyalkanes or epoxycycloalkanes, typically containing from 2 to about 20 carbon atoms, with organic carboxylic acids.

In reaction with a monofunctional oxirane any mono-, di- or polybasic organic carboxylic acids which are aliphatic, aromatic, heterocyclic or polymeric in nature, may be used. One important group of acids are carboxy-terminated polymers such as the carboxy-terminated polybutadienes. The organic carboxylic acids which may be employed in the practice of the present invention include oxalic acid, malonic acid, succinic acid, glutaric acid, adipic acid, pimelic acid, azelaic acid, sebacic acid, brassylic acid, trimellitic acid, trimesic acid, phthalic acid, isophthalic acid, o, m, and p, dicarboxy benzophenones, 1,2 or 1,3 or 1,4 or 1,5 or 1,6 or 1,7 or 1,8 or 2,3 or 2,7 or 2,6 or 2,5, etc., naphthalene dicarboxylic acids, dimer fatty acid, trimer fatty acid and polyester acids.

In reaction with a mono acid such as acetic, acrylic, propionic, benzoic, chloroacetic, lactic and the like, there may be employed in addition to the recited monoepoxides, such polyfunctional oxiranes as the diglycidyl ether of bisphenol A, cyclopentadiene dioxide, resorcinol diglycidyl ether, 1,2,4,5, diepoxycyclohexane, and butanediol diglycidylether.

It is seen that all of the above reactions give rise to nonpolymeric adducts which contain beta hydroxy ester linkages.

In the practice of the invention, the trivalent active chromium catalyst compound is used in an effective catalytic amount of from about 0.1 to about 10% by weight of the reactants.

The following examples are presented solely to illustrate the invention and should not accordingly be regarded as limiting in any way. The examples, the parts and percentages are by weight unless otherwise indicated.

EXAMPLES I to VI

Preparation of bis(hydroxyethyl) terephthalate

The followingg general procedure was employed for the studies involving reaction solvent evaluation.

The reactor utilized was a magnetically stirred, air-driven 1-liter, stainless steel autoclave equipped with several inlet ports, burst diaphragm, baffle, dip-pipe, pressure-release valve, thermowell, heater and pressure gauge (0–300 psig).

To the clean reactor was added the solvent (400 ml) shown in Table I, with dissolved active chromium octoate (COT) (chromium(2-ethylhexanoate) (0.83g,) (0.6% by weight of reactants) and terephthalic acid (TPA) (83.0g, 0.50 mole). The magnetic stirrer assembly and upper plate were lowered into position and the bolts secured using a torque wrench (90–100 ft-lb); the ethylene oxide (EO) (52.0g, 1.18 moles) cylinder under nitrogen pressure (250 psig) was placed in position and tightened. The entire system was purged with nitrogen through the dip-pipe and sealed. At this point, the stirrer was activated and heat applied via a heating jacket using two variacs. When the temperature had risen to 120°C and the pressure to 60 psig, the ethylene oxide (EO) was quickly added. Over a period of 1 hour, the temperature remained essentially constant and the pressure dropped to 25–30 psig. The entire system was cooled to below 65°C. The reaction products derived from the stabilizing solvent runs, which contained dissolved chromium, were evaporated free of solvent. The bis-HET was then recrystallized from hot water and dried.

In the case of the control experiment utilizing only 4-methyl-2-pentanone (MIBK), a neutral solvent, the material was filtered free of precipitated catalyst and unreacted acid. The filtrate containing the total product was evaporated free of solvent at 50°to 60°C. using water aspirator vacuum and dried further to a constant weight.

The results of the use of the dual solvent system of this invention on the yield and purity of bis-HET are summarized in the following table.

TABLE I

SOLVENT EVALUATION IN THE bis-HET PROCESS
(At 120 to 130°C/1 Hour. Catalyzed by 1% COT)

| Stabilizing Solvent | Neutral/Coordination Solvent Volume Ratio | Bis-HET Yield, % | Glycolester Ether[a], % |
|---|---|---|---|
| 4-Methyl-2-Pentanone[b] (MIBK) (Neutral) | 100/0 | 87.0 | 8.90 |
| N,N-Dimethylformamide/ Toluene | 50/50 | 98.5 | 2.21 |
| N,N-Dimethylformamide/ Toluene[c] | 50/50 | 98.5 | 1.00 |
| Toluene/Methanol | 50/50 | 89.0 | 1.46 |
| Toluene/Methanol | 30/70 | 41.0 | 1.65 |
| Methanol (Coordinating) | 0/100 | 37.0 | 3.18 |

[a]Determined by vapor phase chromatography on the acetylated glycols after saponification of bis-HET sample.
[b]Control solvent.
[c]Run 10 minutes at 120°C.

EXAMPLE VII

Reaction of Terephthalic Acid with 1,2-Epoxyhexane in Methanol/Toluene

Into a 100 ml round bottom flask equipped with a reflux condenser was placed 8.3g (0.05) mole of terephthalic acid (TPA), 15g (0.15) mole of 1,2-epoxyhexane, 0.5g (6.0% based on TPA) of chromium octoate (COT) and 40 ml of solvent (70% methanol/30% toluene by volume). The mixture was refluxed (65°C) for 24 hours at which time the solid TPA had reacted leaving a clear green solution. On cooling, 17.4g (95%) of the bis-(2-hydroxyhexyl) terephthalate crystallized and was collected by filtration; mp 134°–135°; infrared (Nujol), 3400 (OH), 1720 (C=O) cm$^{-1}$. In a control run using only toluene as a solvent, the chromium catalyst was precipitated after refluxing for 5 minutes. This example demonstrates that the catalyst used is maintained in solution in the solvent system of the instant invention.

EXAMPLE VIII

Reaction of Terephthalic Acid with 1,2-Epoxyhexane in DMF/Toluene

Into a 100 ml round bottom flask equipped with a reflux condenser was placed 8.3g (0.05 mole) of terephthalic acid (TPA), 10g (0.10 mole) of 1,2-epoxyhexane, 0.1g (1.2% based on TPA) of chromium octoate (COT) and 40 ml of solvent (50/50 DMF/toluene by volume). The mixture was heated at reflux (109°C) for 30 minutes at which time the solid terephthalic acid (TPA) was reacted to yield a clear green solution. After the addition of 100 ml of methanol, 17.0g (93%) of bis-(2-hydroxyhexyl) terephthalate crystallized; mp 134–135°C.: infrared (Nujol), 3400 (OH), 1720 (C=O) cm$^{-1}$.

In toluene alone, the chromium catalyst precipitated after 5 minutes at reflux, and significantly less than 17.0 g of bis-HET was obtained.

It is to be seen that while the examples specify the use of but one neutral solvent with one coordinating solvent, mixtures of 2 or more of each class of solvents can be utilized with equal success.

What is claimed is:

1. An improved method for the reaction of mono oxiranes with mono, di and poly carboxylic acids and for the reaction of mono carboxylic acids with mono, di and polyfunctional oxiranes which comprises reacting at least one oxirane with at least one carboxylic acid in a solvent system consisting essentially of at least one neutral solvent, said neutral solvent being a solvent which is incapable of donating an unshared pair of electrons to metallic cations, and having a boiling point under 300°C., and at least one coordinating solvent, said coordinating solvent being a solvent which can donate an unshared pair of electrons to metallic cations, in the presence of an effective catalytic amount of an active chromium III tricarboxylate compound having available coordination sites, wherein the coordinating solvent comprises from 20 to about 80 percent of the solvent system.

2. The method of claim 1 wherein the neutral solvent is a hydrocarbon.

3. The method of claim 1 wherein the neutral solvent is methyl isobutyl ketone.

4. A method in accordance with claim 1 wherein the organic carboxylic acid is selected from the group consisting of acetic acid, acrylic acid and propionic acid and benzoic acids.

5. A method in accordance with claim 1 wherein the acid is terephthalic acid, and the oxirane is ethylene oxide.

6. A method in accordance with claim 1 wherein the oxirane compound is a mono epoxide.

7. A method in accordance with claim 1 wherein the carboxylic acid is monofunctional.

8. A method in accordance with claim 1 wherein the carboxylic acid is di-or polyfunctional.

9. A method in accordance with claim 2 wherein the coordinating solvent is ethanol.

10. A method in accordance with claim 1 wherein the solvent system is methanol and toluene.

11. A method in accordance with claim 1 wherein the neutral solvent is a halogenated hydrocarbon.

12. A method in accordance with claim 1 wherein the solvent system has toluene for its neutral solvent and the coordinating solvent is N, N-dimethyl formamide.

13. A method in accordance with claim 1 wherein the amount of the active chromium catalyst used is from 0.1% to 10% by weight of the reactants.

14. A method in accordance with claim 1 wherein the coordinating solvent is a cyclic ether or cyclic thioether.

15. A method in accordance with claim 1 wherein the coordinating solvent is a primary alcohol.

16. A method in accordance with claim 1 wherein the coordinating solvent is a heteroatom oxide.

17. A method in accordance with claim 1 wherein the coordinating solvent is a tertiary amide.

18. A method in accordance with claim 1 wherein the coordinating solvent is a tertiary phosphine.

19. A method in accordance with claim 1 wherein the solvent system contains at least three solvents at least one of which is neutral and at least one of which is a co-ordinating solvent.

20. The method of claim 1 wherein the active Chromium III tricarboxylate compound having available co-ordination sites is chromium octoate.

21. The method of claim 1 wherein the active Chromium III tricarboxylate compound having available co-ordination sites is chromium oleate.

22. A method in accordance with claim 1 wherein the oxirane is di or polyfunctional.

* * * * *